United States Patent [19]

Takaochi et al.

[11] Patent Number: 4,744,635
[45] Date of Patent: May 17, 1988

[54] COLOR FILTER WITH A POROUS ACTIVATED FILM LAYER HAVING DYE FIXED IN THE MINUTE PORES TO FORM COLOR OR PATTERN

[75] Inventors: Minoru Takaochi, Kyoto; Kozo Matsumura, Otokuni; Takao Sumi; Kenichi Masaki, both of Kyoto, all of Japan

[73] Assignee: Nissha Printing Co., Ltd., Japan

[21] Appl. No.: 93,131

[22] Filed: Sep. 1, 1987

Related U.S. Application Data

[63] Continuation of Ser. No. 817,622, filed as PCT JP85/00263 on May 10, 1985, published as WO85/05462, Dec. 5, 1985, abandoned.

[30] Foreign Application Priority Data

May 14, 1984 [JP] Japan .................. 59-97210

[51] Int. Cl.$^4$ ........................... G02B 5/22
[52] U.S. Cl. ..................... 350/311; 252/584; 350/339 F
[58] Field of Search .............. 350/339 F, 311, 315, 350/316, 317, 341; 252/584, 586

[56] References Cited

U.S. PATENT DOCUMENTS 3,865,469  2/1975  Asai et al. ............... 350/339 F
4,239,842 12/1980  Sandhu .................... 350/311
4,383,018  5/1987  Martin et al. ............. 350/311

FOREIGN PATENT DOCUMENTS 53-99822   8/1978  Japan .
53-110379  9/1978  Japan .
55-166607 12/1980  Japan .
58-17420   2/1983  Japan .
58-50583   3/1983  Japan .
0220160   12/1983 Japan ..................... 350/311

Primary Examiner—Stanley D. Miller
Assistant Examiner—Huy V. Mai
Attorney, Agent, or Firm—Franklin D. Wolffe; Morris Fidelman

[57] ABSTRACT

The color filter of this invention comprises a transparent substrate, a porous activated film layer formed on the substrate and made of activated alumina or activated silica or a mixture thereof, a colored area or a pattern formed by the dye fixed in the minute pores of the activated film layer, and a coating layer sealingly closing the upper portions of the minute pores of said activated film layer. This color filter is relatively simple and easy to manufacture, superior in resistivity to heat, water, chemicals, solvents, etc. and suitable for use as a color filter in various display devices, particularly liquid crystal display devices.

11 Claims, 1 Drawing Sheet

COLOR FILTER WITH A POROUS ACTIVATED FILM LAYER HAVING DYE FIXED IN THE MINUTE PORES TO FORM COLOR OR PATTERN

This application is a continuation of U.S. application Ser. No. 817,622, filed as PCT JP85/00263 on May 10, 1985, published as WO85/05462, Dec. 5, 1985, abandoned.

TECHNICAL FIELD

This invention relates to a color filter for use in various display devices and more particularly a color filter which enables color display in various display devices.

BACKGROUND ART

In recent years liquid crystal display devices are widely used for digital display in table electronic computers, electronic clocks, etc., or for analog display in measuring instruments, electronic instruments for domestic use, acoustic instruments, etc. In particular, recently there is an increasing demand for coloration of display by liquid crystal display devices used in the terminal devices of various meters and instruments in an automobile, telephones and television receivers. To meet the demand there have been proposed various color liquid crystal display devices. some of which have already been put to practical use.

Examples of known color filters adapted for use in liquid crystal display devices to enable color display are as follows:

A. The one which comprises a transparent substrate on the inner surface of which a gelatin layer is formed and colored with acid dye.

B. The one which comprises a transparent substrate on the inner surface of which a layer of nitrogen-containing resin capable of being colored is formed and colored with acid dye.

C. The one which comprises a transparent substrate on the inner surface of which a transparent electrode is first formed and a color layer is formed by electrodeposition with the transparent electrode used as a plating electrode.

These filters, however, have disadvantages such as follows:

Since the color filter A is not resistive to heat, cracks are produced by application of heat necessary for formation of a transparent electrically conductive film on the color filter by vacuum evaporation. If the vacuum evaporation is conducted at low temperature, the transparent electrically conductive film will have a high electrical resistance or a low transmittance. Since the filter is not resistive to water, it is difficult to rinse it with an aqueous solution, and the display function of the liquid crystal is lowered by dirt.

Since the color filter B is not resistive to heat, either, as in the case of the above-mentioned color filter, cracks are produced by application of heat necessary for formation of a transparent electrically conductive film by vacuum evaporation. If the vacuum evaporation is conducted at low temperature, the transparent electrically conductive film will have a high electrical resistance or a low transmittance. There is also a problem that the resin is decomposed, colored or melted. Even in the temperature range where no such problem arises, there is also a danger of occurrence of what is called bleeding, that is, a phenomenon that the dye that has formed a particular pattern is caused by the heat to migrate into those areas where it should not, thereby to cause mixing of colors.

In both the color filters A and B, since the dyeing is conducted by photolithography, the manufacturing process is complicated and the cost is high. When a pattern of more than two colors is to be formed, it is impossible to form component parts of different colors on the same plane, and it is impossible to make thick layers, with resulting difficulty of dyeing at high density.

In the color filter C, since the color layer is formed by electrodeposition, the number of the kinds of dyes or pigments that can be used is small, so that there is a limitation to the kinds of colors that are available for dyeing.

DISCLOSURE OF THE INVENTION

The object of the present invention is to provide a color filter which is superior in resistivity to heat, water, etc. and can provide a pattern having a sharply defined contour and enable presentation of a variety of colors. This object is attained by the following construction of the present invention, The color filter of the present invention is characterized by that it comprises a transparent substrate, a porous activated film layer of activated alumina or activated silica or a mixture thereof formed on the substrate, a colored area or pattern formed on the dye fixed in the minute pores of the activated film layer, and a coating layer for sealing the upper portions of the minute pores of the activated film layer colored with the dye.

THE BEST MODE OF EMBODYING THE INVENTION

Figure 1:
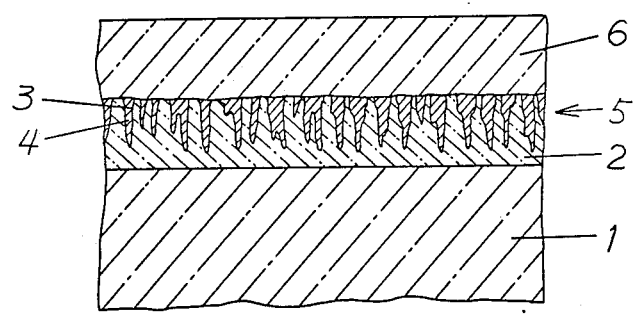
FIG. 1 is a schematic enlarged cross-sectional view of a color filter in one embodiment of the present invention.

One embodiment of the present invention will be explained in detail below. For clarity of illustration the drawing is exaggerated with the relative dimensions of the component parts being neglected.

Referring to FIG. 1, there are shown a transparent substrate 1, an activated film layer 2 formed thereon, a colored portion or pattern 5 formed by the dye 4 fixed in a plurality of minute pores 3 of the activated film layer 2, and a coating layer 6 on the activated film layer 2.

The transparent substrate 1 is a plate commonly used in liquid crystal display devices. Usually a glass plate may advantageously be used.

The activated film layer 2 formed on the transparent substrate 1 is made of activated alumina or activated silica or a mixture of both these substances. To form the activated film layer 2, colloidal alumina or colloidal silicia or a mixture thereof is first applied to the surface of the transparent substrate and dried and then sintered at 350° C. to 850° C. for 10 minutes to 180 minutes. The activated film layer 2 formed in this manner is transparent with a number of minute pores 3 formed therein, constituting a layer to be dyed. Desirably the activated film layer 2 has a thickness of 0.5 μm to 10 μm, preferably 1.5 μm to 5 μm in consideration of the transparency, surface hardness, receptivity of dyes and other qualities thereof. A greater thickness renders the activated film layer milky and opaque, whereas a smaller thickness makes it impossible to obtain a required density of the coloration.

The dye 4 which is fixed in the minute pores 3 of the activated film layer 2 to form a colored area of pattern 5 can be a sublimable dye and/or a thermo-diffusible and evaporable dye, etc. In practice, disperse dyes, oil-soluble dyes which do not contain metal, cation dyes, etc. are used.

Dyeing with the above-mentioned dyes may be conducted with an ink containing a dye at such a temperature as to cause the dye to be thermally transferred into the minute pores, for example, at 100° C. to 250° C. for several to 60 minutes. The temperatures varies with different kinds of dyes.

To form the colored portion or pattern 5 on the acitvated film layer 2 any of the following methods may be employed.

(1) Method where the acitvated film layer is dipped in a dye solution.

(2) Method wherein a dye solution is sprayed over the activated film layer.

(3) Method wherein a dye solution is applied to the activated film layer.

(4) Method wherein a mask having a pattern formed therein is placed on the upper surface of the activated film layer and a sheet of transfer material printed with dye is placed on the mask and heated and pressed so as to cause the dye thereon to be transferred onto the activated film layer through the mask.

(5) Method wherein a dye is set in the cells of a gravure plate, which is brought into close contact with the surface of the activated film layer and heated to transfer the dye in the cells to the activated film layer.

(6) Method wherein a sheet of transfer material having a pattern formed thereon with dye is brought into close contact with the surface of the activated film layer and heated to transfer the dye on the sheet of transfer material to the activated film layer.

(7) Method wherein the required portion of the activated film layer is dyed by heating.

(8) Method wherein a pattern is directly printed on the activated film layer.

(9) Method wherein the required portion of the activated film layer is dyed, with a resist having been applied to the other portions.

(10) Method wherein the whole surface of the activated film layer is colored with a dye solution and the portions other than the required portion of the layer is decolorized.

(11) Method wherein the activated film layer itself is formed into a pattern and the layer is dyed.

(12) Method wherein a pattern is depicted on the activated film layer by hand.

Of these methods, methods (1) (2) and (3) are more suitable for coloring the whole surface of the activated film layer uniformly while methods (4) (5) (6) and (7) are more suitable for coloring the pattern. The pattern to be formed by dyeing may be designed according to its use. According to this invention, dot patterns can be formed with ease. In this case, there are patterns of more than two colors, with the pattern of each color being formed at a position accurately coinciding with a corresponding pattern of a transparent electrically conductive film.

The coating layer 6 is formed on the upper portion of the minute pores 3 of the activated film layer 2 having dye fixed therein so as to seal the pores. The coating layer 6 may be formed by applying a hard transparent resin such as acrylic, melamine, epoxy, silicone, polyimide, etc. to the above-mentioned activated film layer, and heating it at such a temperature as to cause the resin to be set. Besides the above-mentioned resins, the coating layer 6 may be formed by applying and heating an inorganic material such as sodium silicate, lithium silicate, etc. The coating layer 6 is a layer for preventing the dye molecules arrested in the minute pores of the activated film layer from being evaporated again and the dyed portions from becoming dirty.

In order to form a transparent electrically conductive film having a desired pattern on the coating layer 6 of a color filter obtained by the present invention at a later step of the process, it is preferable that the coating layer should be made of a material having a good adhesivity to the material which forms the transparent electrically conductive film.

Figure 2:
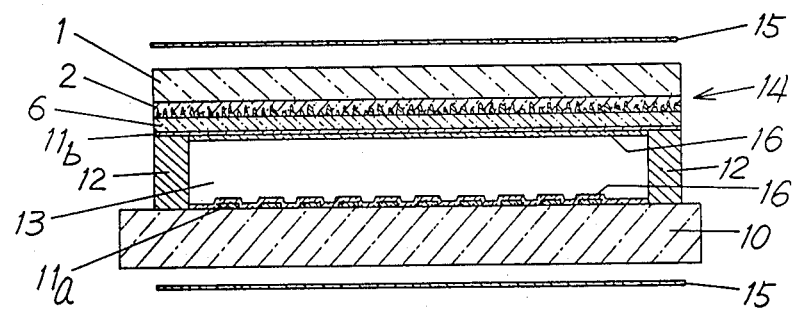
FIG. 2 is a schematic cross-sectional view of an example of a liquid crystal display panel which employs a color filter of the present invention.

FIG. 2 schematically shows an example in which a color filter of the above-mentioned construction is used in a liquid crystal display device. On the surface of a transparent base plate 10 there is formed a transparent electrode 11a, and a color filter 14 of the present invention is arranged to face the surface of the electrode across a space 13 formed by spaces 12, with a transparent electrode 11b being provided on the color filter 14, and liquid crystal is enclosed in the space 13. A polarizing plate 15 is arranged adjacent the outer surface of each of the base plate 10 and the color filter 14. An orientated film 16 covers each of the transparent electrodes 11a and 11b.

The color filter according to the present invention has the following advantages. Since the activated film layer of activated alumina or activated silica is formed on the transparent substrate, the filter is superior to conventional color filters with respect to resistivity to heat, water, chemicals and solvents. Since the dye forming the colored portion or pattern is fixed in the individual independent pores of the above-mentioned activated film layer, there is no problem of bleeding and even those dyes which require a relatively high temperature and a long time can be used for coloration. Since it is possible to use any dye that can be fixed in the minute pores of the activated film layer, it is possible to express various colors. Furthermore, the method of coloring or forming patterns is simple and easy.

POSSIBLE INDUSTRIAL APPLICATIONS

The color filter according to the present invention is extremely excellent is resistivity to heat, water and chemicals, and relatively simple and easy to manufacture, so that it can be used very effectively as a color filter in liquid crystal display devices and other display devices.

What is claimed is:

1. A color filter comprising a transparent substrate, a porous activated film layer formed on the substrate and made of activated alumina or activated silica or a mixture thereof, a colored portion or pattern formed of a dye fixed in the minute pores of the activated film layer, and a coating layer sealing the upper portions of the minute pores of said activated film layer.

2. The color filter described in claim 1 wherein the thickness of said activated film layer is 0.5 $\mu$m to 10 $\mu$m.

3. The color filter described in claim 1 wherein the dye in the minute pores of said activated film layer consists substantially of a sublimable dye and/or a thermo-diffusible and evaporable dye.

4. The color filter described in claim 1 further including a transparent electrically conductive film of a desired pattern formed so as to cover said coating layer.

5. The color filter described in claim 4 wherein patterns of more than two colors are formed by dyes, and said transparent electrically conductive film comprises patterns each corresponding to the pattern of each of said colors, and the pattern of each of said colors and the corresponding one of the patterns of said electrically conductive film are formed at positions accurately coinciding with each other.

6. The color filter described in claim 5 wherein said coating layer is made of a resin having a high adhesivity to the material constituting said transparent electrically conductive film.

7. The color filter described in claim 4 wherein said coating layer is made of a resin having a high adhesivity to the material constituting said transparent electrically conductive film.

8. A method for forming a color filter which comprises: applying a layer of colloidal alumina or silica or a mixture thereof on transparent substrate; thereafter drying then sintering the layer to form thereby a transparent activated film layer on said substrate with a number of minute pores therein; thereafter applying a dye to said activated film layer uniformly or in a pattern; and, subsequently applying a transparent sealing coating over the dyed activated film layer.

9. The method of claim 8 further comprising placing a transparent electrically conductive film over said sealing coating.

10. The method of claim 8 wherein the thickness of said activated film layer is in the range of 0.5 $\mu$m to 10 $\mu$m.

11. The method of claim 8 further comprising applying dye in patterns of at least two colors to said activated film layer and applying thereover a transparent electrically conducting film with patterns thereon corresponding to each dye color with the color pattern of electrically conductive film pattern in registry.

* * * * *